US012779700B2

(12) United States Patent
Kamon et al.

(10) Patent No.: US 12,779,700 B2
(45) Date of Patent: Nov. 3, 2026

(54) ROBOT SYSTEM AND ROBOT WORKING METHOD

(71) Applicant: KAWASAKI JUKOGYO KABUSHIKI KAISHA, Hyogo (JP)

(72) Inventors: Masayuki Kamon, Kobe (JP); Hitoshi Hasunuma, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 279 days.

(21) Appl. No.: 18/269,067

(22) PCT Filed: Dec. 21, 2021

(86) PCT No.: PCT/JP2021/047361
§ 371 (c)(1),
(2) Date: Oct. 26, 2023

(87) PCT Pub. No.: WO2022/138652
PCT Pub. Date: Jun. 30, 2022

(65) Prior Publication Data

US 2024/0238984 A1 Jul. 18, 2024

(30) Foreign Application Priority Data

Dec. 24, 2020 (JP) ................................ 2020-215816

(51) Int. Cl.
*B25J 13/06* (2006.01)
*B25J 5/00* (2006.01)

(52) U.S. Cl.
CPC ............... *B25J 13/06* (2013.01); *B25J 5/007* (2013.01)

(58) Field of Classification Search
CPC . B25J 5/007; B25J 13/06; B25J 9/0084; B25J 9/1682; B25J 9/1689; B25J 13/065;
(Continued)

(56) References Cited

U.S. PATENT DOCUMENTS

2002/0082612 A1* 6/2002 Moll ...................... G16H 40/63 606/130
2010/0010673 A1 1/2010 Wang et al.
2023/0134949 A1* 5/2023 Hashimoto .......... B25J 15/0491 606/1

FOREIGN PATENT DOCUMENTS

EP 1131004 10/2009
JP 2011-528570 11/2011
(Continued)

OTHER PUBLICATIONS

Malysz, Pawel et al., "Maneuverability and Grasping Experiments in Teleoperation of Nonholonomic/Twin-Armed Robots," IEEE Haptics Symposium (2012), pp. 203-209.
(Continued)

*Primary Examiner* — Khoi H Tran
(74) *Attorney, Agent, or Firm* — Greenblum & Bernstein, P.L.C.

(57) ABSTRACT

A robot system includes a self-propelled robot 1 having an autonomously travelable carriage and at least one robotic arm mounted on the carriage, and a plurality of manipulation consoles that manipulate the self-propelled robot. The plurality of manipulation consoles include a first manipulation console that exclusively operates some of a plurality of to-be-operated parts of the self-propelled robot including the carriage and the at least one robotic arm, and a second manipulation console that exclusively operates some or all of the remainder of the plurality of to-be-operated parts.

12 Claims, 6 Drawing Sheets

(58) Field of Classification Search
CPC .... B25J 9/0087; B25J 9/1612; B25J 15/0052; B25J 9/162
USPC .......................................................... 700/265
See application file for complete search history.

(56) References Cited

FOREIGN PATENT DOCUMENTS

| | | |
|---|---|---|
| JP | 6137005 | 5/2017 |
| JP | 2019-107721 | 7/2019 |

OTHER PUBLICATIONS

Lunghi, Giacomo et al., "Multimodal Human-Robot Interface for Accessible Remote Robotic Interventions in Hazardous Environments," IEEE Access, vol. 7 (2019), pp. 127290-127319.

* cited by examiner

114

| | ARM | HOIST | TRAVELER |
|---|---|---|---|
| 1ST MANIPULATOR | | | |
| 2ND MANIPULATOR | | | |
| 3RD MANIPULATOR | | | |

FIG. 5A

114

| | ARM | HOIST | TRAVELER |
|---|---|---|---|
| 1ST MANIPULATOR | + | | |
| 2ND MANIPULATOR | − | | |
| 3RD MANIPULATOR | − | | |

FIG. 5B

114

| | ARM | HOIST | TRAVELER |
|---|---|---|---|
| 1ST MANIPULATOR | + | | − |
| 2ND MANIPULATOR | − | | + |
| 3RD MANIPULATOR | − | | − |

FIG. 5C

114

| | ARM | HOIST | TRAVELER |
|---|---|---|---|
| 1ST MANIPULATOR | + | − | − |
| 2ND MANIPULATOR | − | − | + |
| 3RD MANIPULATOR | − | + | − |

FIG. 5D

| | ARM | HOIST | TRAVELER |
|---|---|---|---|
| 1ST MANIPULATOR | + | − | − |
| 2ND MANIPULATOR | − | + | + |
| 3RD MANIPULATOR | − | − | − |

ROBOT SYSTEM AND ROBOT WORKING METHOD

CROSS-REFERENCE TO RELATED APPLICATIONS

This application is a National Stage of International Application No. PCT/JP2021/047361 filed Dec. 21, 2021, which claims priority to Japanese Patent Application No. 2020-215816 filed Dec. 24, 2020. The content of each of the above-identified applications is incorporated herein by reference in its entirety.

TECHNICAL FIELD

The present disclosure relates to a robot system and a robot working method.

BACKGROUND ART

Conventionally, a work which is performed by a person is performed by a self-propelled robot having a robotic arm.

For example, Patent Document 1 discloses performing raising and lowering of a load to/from a shelf using a self-propelled robot having a robotic arm.

REFERENCE DOCUMENT(S) OF CONVENTIONAL ART

Patent Document

[Patent Document 1] JP6137005B2

DESCRIPTION OF THE DISCLOSURE

Problem(s) to be Solved by the Disclosure

Meanwhile, among the works performed using the self-propelled robot, there is a work performed by the robotic arm while the self-propelled robot travels. However, according to the above-described conventional art, since a traveler and the robotic arm of the self-propelled robot are operated by a single operation terminal (in other words, operated by a single person), such a work may not always be conducted suitably.

The present disclosure is made in order to solve the above problem, and one purpose thereof is to provide a robot system and a robot working method, which are capable of suitably performing a work by using an arm, while the self-propelled robot travels.

SUMMARY OF THE DISCLOSURE

In order to achieve the purpose described above, a robot system according to one aspect of the present disclosure includes a self-propelled robot having an autonomously travelable carriage and at least one robotic arm mounted on the carriage, and a plurality of manipulation consoles that manipulate the self-propelled robot. The plurality of manipulation consoles include a first manipulation console that exclusively operates some of a plurality of to-be-operated parts of the self-propelled robot including the carriage and the at least one robotic arm, and a second manipulation console that exclusively operates some or all of the remainder of the plurality of to-be-operated parts.

Further, a robot working method according to another aspect of the present disclosure is a robot working method using a self-propelled robot having an autonomously travelable carriage and at least one robotic arm mounted on the carriage, and a plurality of manipulation consoles that manipulate the self-propelled robot, including a first manipulation console and a second manipulation console, and includes exclusively operating, by the first manipulation console, some of a plurality of to-be-operated parts of the self-propelled robot including the carriage and the at least one robotic arm, and exclusively operating, by the second manipulation console, some or all of the remainder of the plurality of to-be-operated parts.

Effect of the Disclosure

The present disclosure provides the robot system and the robot working method, which are capable of suitably performing a work by using an arm, while the self-propelled robot travels.

BRIEF DESCRIPTION OF DRAWINGS

FIG. 5A is an association table illustrating association between manipulators of a group of manipulators and to-be-operated parts of the self-propelled robot, and illustrates a state where no association is established they are not associated with each other.

FIG. 5B is an association table illustrating the association between the manipulators of the group of manipulators and the to-be-operated parts of the self-propelled robot, and illustrates a state where a first manipulator is associated with the to-be-operated part of the self-propelled robot.

FIG. 5C is an association table illustrating the association between the manipulators of the group of manipulators with the to-be-operated parts of the self-propelled robot, and illustrates a state where the first manipulator and a second manipulator are associated with the to-be-operated parts of the self-propelled robot.

FIG. 5D is an association table illustrating the association between the manipulators of the group of manipulators with the to-be-operated parts of the self-propelled robot, and illustrates a state where the first manipulator, the second manipulator, and a third manipulator are associated with the to-be-operated parts of the self-propelled robot.

MODES FOR CARRYING OUT THE DISCLOSURE

Figure 1:
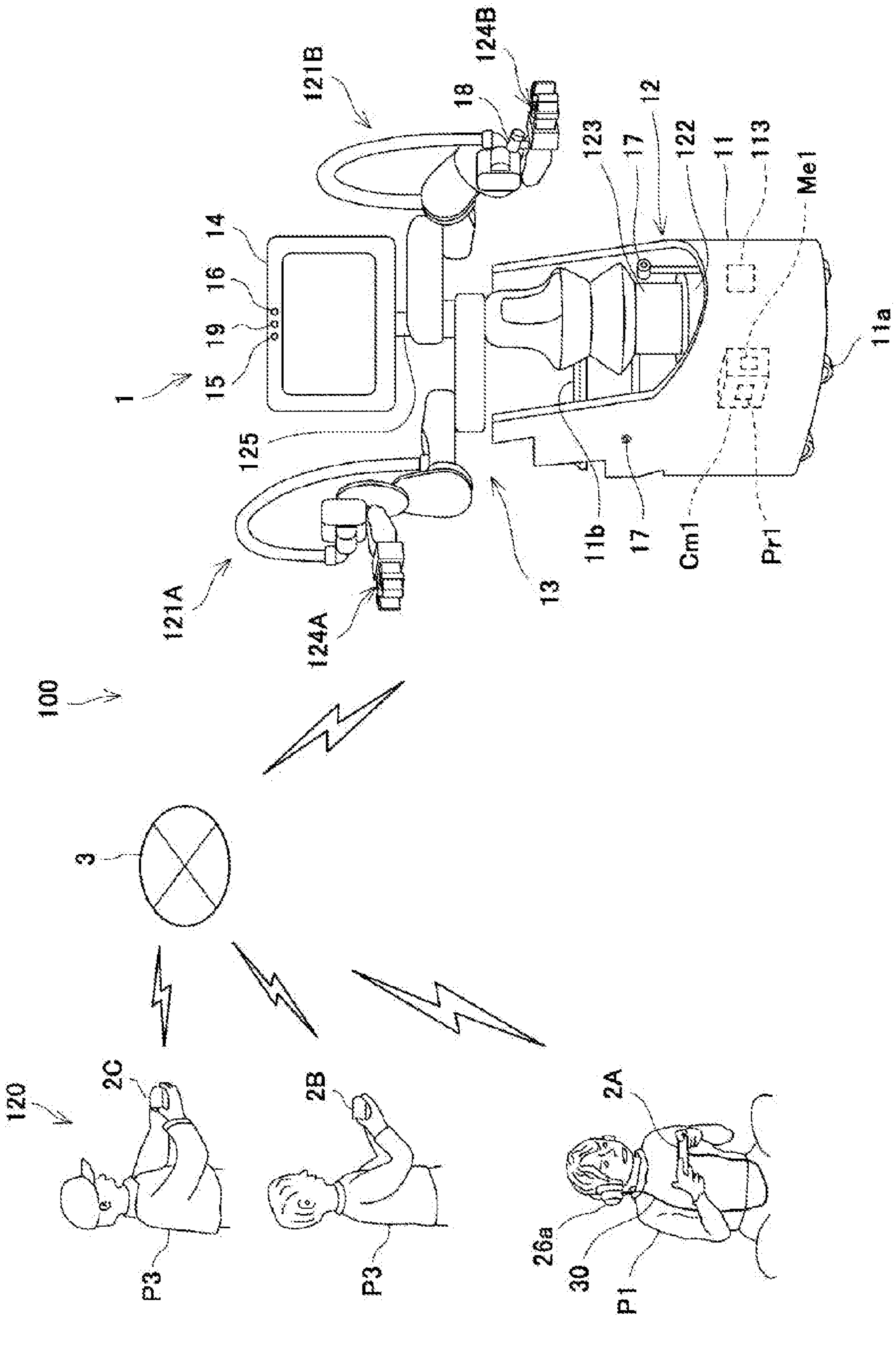
FIG. 1 is a schematic view illustrating one example of a configuration of a robot system according to Embodiment 1 of the present disclosure.

Hereinafter, concrete embodiments of the present disclosure are described with reference to the drawings. Note that, below, the same reference characters are assigned to the same or corresponding elements throughout the drawings to omit redundant explanations. Further, since the following drawings are for explaining the present disclosure, elements unrelated to the present disclosure may be omitted, the dimension may not be exact because of an exaggeration etc., the elements may be simplified, and the modes of mutually-corresponding elements may not match with each other in a plurality of drawings. Moreover, the present disclosure is not limited to the following embodiments.

Embodiment 1

FIG. 1 is a schematic view illustrating one example of a configuration of a robot system 100 according to Embodiment 1 of the present disclosure.

[Hardware Configuration]

Referring to FIG. 1, the robot system 100 of Embodiment 1 includes a self-propelled robot 1 having a traveler 11 which is autonomously travelable and an arm 13 provided to the traveler 11, and a group of manipulators (a plurality of manipulation consoles) 120 including three manipulators (manipulation consoles) 2A-2C. The three manipulators 2A-2C of the group of manipulators 120 are capable of exclusively operating the traveler 11, a hoist 12, and the arm 13 of the self-propelled robot 1.

In detail, the robot system 100 includes the self-propelled robot 1 and two or more (here, three) manipulators 2A-2C.

The self-propelled robot 1 is connected with the two or more manipulators 2A-2C via a data communication network 3, for example. The self-propelled robot 1 may be directly connected to the two or more manipulators 2A-2C wiredly or wirelessly. Note that, as for the two or more manipulators, when specifying each manipulator, a reference character (2A, 2B, 2C . . . ) is assigned, and when specifying the two or more manipulators comprehensively, or when specifying a representative manipulator, a reference character 2 is assigned to the manipulator.

Below, these elements in the robot system 100 will be described in detail.

<Data Communication Network 3>

The data communication network 3 may be any network as long as it enables data communications. Examples of the data communication network 3 are the Internet, a LAN (Local Area Network), a WAN (Wide Area Network), etc.

<Self-Propelled Robot 1>

Referring to FIG. 1, the self-propelled robot 1 may fundamentally be any configuration as long as it includes a traveler 11 which is autonomously travelable, and an arm (robotic arm) 13 mounted on the traveler 11.

Here, the self-propelled robot 1 includes the traveler 11, a hoist (elevator) 12, and the arm 13.

The traveler 11 is comprised of a carriage, for example (hereinafter, referred to be as "the carriage 11"). The carriage 11 is provided at its base part with wheels 11*a* comprised of front wheels and rear wheels. One of the front wheels and the rear wheels are steering wheels, and at least one of the front wheels and the rear wheels are driving wheels. The hoist 12 is provided to a front part of the carriage 11, and a shelf 11*b* where article(s) is placed is provided to a rear part of the carriage 11.

Further, the carriage 11 includes a battery and a motor, and the carriage 11 autonomously travels by the motor driving the wheels 11*a* while using the battery as a power supply. The hoist 12 and the arm 13, and a robot-side display (robot-side monitor) 14, a robot-side microphone 15, and a robot-side sound emitter (robot-side speaker) 16, which will be described later, operate using this battery as a power supply.

The hoist 12 includes a base 122, and a hoist shaft 123 which ascends and descends with respect to the base 122.

A first robotic arm 121A and a second robotic arm 121B are provided to an upper part of the hoist shaft 123 rotatably on the center axis of the hoist shaft 123. The second robotic arm 121B is provided above the first robotic-arm 121A. Since the first robotic arm 121A and the second robotic arm 121B can interchange respective rotational positions, there is no left arm or right arm.

The first robotic arm 121A and the second robotic arm 121B are comprised of articulated robotic arms, and are provided with a hand 124A and a hand 124B at tip ends, respectively.

Although the hand 124A and the hand 124B are not limited in particular, each has a shape which can grip an object.

A circumference camera 17 is provided in front of the hoist shaft 123. In addition, the circumference cameras 17 are also provided to a right side part (illustrated by the reference character 17), a rear part (not illustrated in FIG. 1), and a left side part (not illustrated in FIG. 1) of the carriage 11. These four circumference cameras 17 are provided at the same height. The four circumference cameras 17 are devices for an operator P to observe a situation (environment) around the self-propelled robot 1.

A hand camera 18 is provided to a tip-end part of the second robotic arm 121B. The hand camera 18 is a device for operators P1-P3 to observe an object to be gripped by the pair of hands 124A and 124B.

The robot-side display 14 is attached to an upper end part of the hoist shaft 123 via a support member 125. The robot-side display 14 is comprised of a liquid crystal display, for example.

The robot-side microphone 15, the robot-side sound emitter 16, and a main camera 19 are provided at suitable locations of the robot-side display 14.

The robot-side display 14, the robot-side microphone 15, the robot-side sound emitter 16, and the main camera 19 constitute a device group for the self-propelled robot 1 to have a conversation with a person (hereinafter, referred to as a "conversation partner"). The robot-side display 14 displays information (image information, text information, etc.) to be communicated to the conversation partner. The robot-side microphone 15 acquires voice of the conversation partner. The robot-side sound emitter 16 is comprised of a loudspeaker, and emits the voice information to be communicated to the conversation partner, for example. The main camera 19 images the conversation partner.

The carriage 11 further includes an arithmetic circuit module Cm1 and a robot-side communicator (robot-side transmitter) 113. The arithmetic circuit module Cm1 includes a processor Pr1 and a memory Me1. The arithmetic circuit module Cm1 constitutes an association part (association circuitry) 111 and a robot controller 112 (see FIG. 4), as will be described later.

<Manipulator 2>

Figure 2:
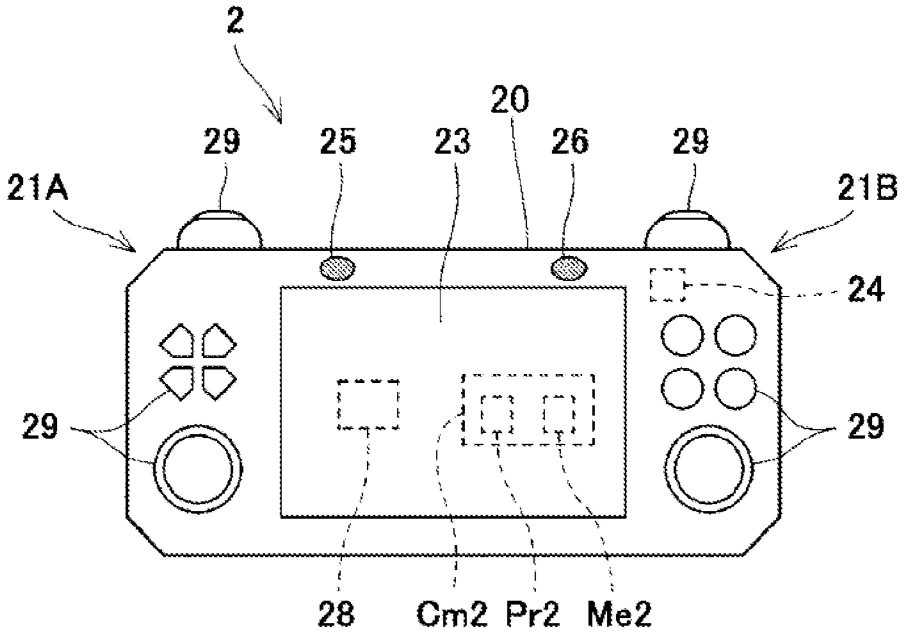
FIG. 2 is a plan view illustrating one example of a configuration of a manipulator of FIG. 1.

FIG. 2 is the plan view illustrating one example of the configuration of the manipulator 2 of FIG. 1. The manipulator 2 is not limited in particular, as long as it is capable of manipulating the self-propelled robot(s) 1. As illustrated in FIG. 2, the manipulator 2 may be configured integrally, or may be comprised of a plurality of manipulating parts which are formed individually. The manipulating part is not limited in particular, as long as it is operable by an operator. Examples of the manipulating part are a key, a joystick, a handle, etc.

Alternatively, as illustrated in FIG. 2, the manipulator 2 may be configured so that the manipulating parts 21A and 21B, a manipulation-side display (manipulation-side monitor) 23, a manipulation-side microphone 25, and a manipulation-side sound emitter (manipulation-side speaker) 26 are integrated, or the manipulating parts 21A and 21B, the manipulation-side display 23, the manipulation-side microphone 25, and the manipulation-side sound emitter 26 may be formed separately.

Referring to FIG. 2, the manipulator 2 is provided with a main body 20. The main body 20 is formed in a thin rectangular parallelepiped box.

The left manipulating part 21A and the right manipulating part 21B are provided to a left end part and a right end part of the main body 20, respectively. The left manipulating part 21A and the right manipulating part 21B constitute a manipulating part 21. In each of the left manipulating part 21A and the right manipulating part 21B, a group of given operation keys 29 are disposed. This group of given operation keys 29 is configured similarly to a well-known operation key group of a game machine, for example. Therefore, explanation of this group of given operation keys 29 is omitted. When the operators P1-P3 operate the operation keys 29 suitably with both hands, the traveler 11, the hoist 12, and the arm 13 of the self-propelled robot 1 operate according to the operation. That is, the manipulating part 21 outputs a manipulation signal for manipulating the traveler 11, the hoist 12, and the arm 13 of the self-propelled robot 1.

The manipulation-side display 23 is provided to a center part of an upper surface of the main body 20. The manipulation-side display 23 is comprised of a touchscreen, for example. The manipulation-side display 23 displays information (image information, text information, etc.) required for the operators P1-P3 to manipulate the self-propelled robot 1. For example, an image captured by the circumference camera 17, an image captured by the main camera 19, and an image captured by the hand camera 18 are suitably displayed on the manipulation-side display 23. Further, an association table (described later) is displayed on the manipulation-side display 23.

The manipulation-side microphone 25 and the manipulation-side sound emitter 26 are provided to suitable locations of the upper surface of the main body 20. The manipulation-side microphone 25 acquires voice of the conversation partner. The manipulation-side sound emitter 26 is comprised of a loudspeaker, and emits the voice of the conversation partner acquired by the robot-side microphone 15, for example. Further, the manipulation-side sound emitter 26 may be provided with a wearable speaker 26*a*, such as a headset. A voice output terminal (not illustrated) is provided to a suitable location of the main body 20, and when connecting a connection cord 30 of the wearable speaker 26*a* to the voice output terminal, an outputting part of the manipulation-side sound emitter 26 is switched from the loudspeaker to the wearable speaker 26*a* so that the voice of the conversation partner acquired by the robot-side microphone 15 is emitted from the wearable speaker 26*a*.

An arithmetic circuit module Cm2 and a manipulation-side communicator (manipulation-side transmitter) 28 are provided inside the main body 20. The arithmetic circuit module Cm2 includes a processor Pr2 and a memory Me2. The arithmetic circuit module Cm2 constitutes an operation controller 27 (see FIG. 4), as will be described later.

[Configuration of Control System]

Figure 3:
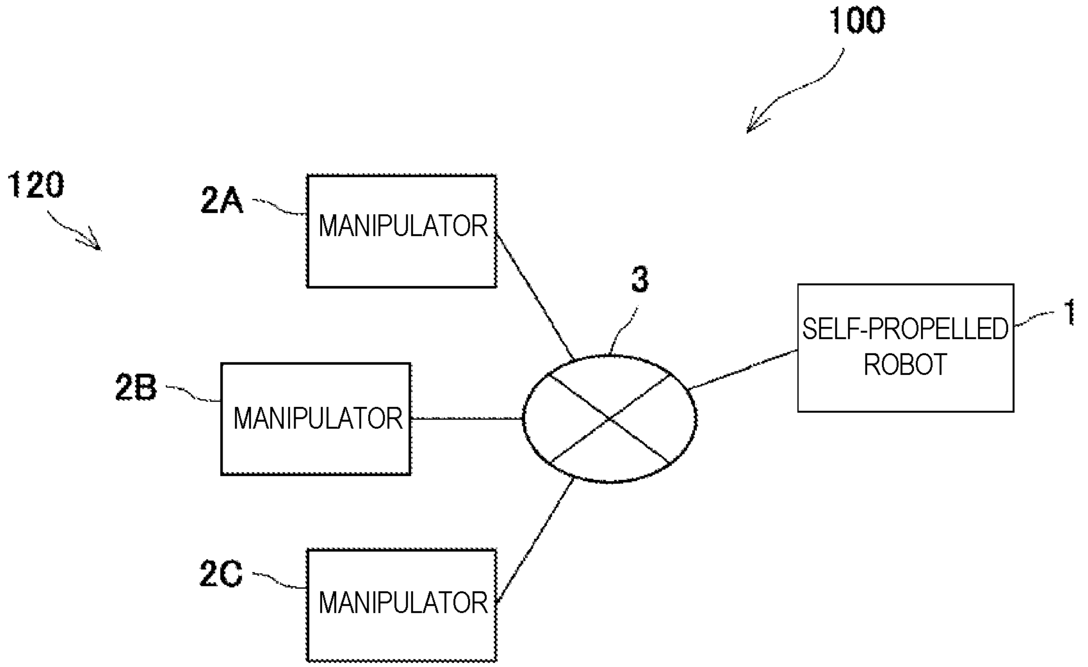
FIG. 3 is a schematic view illustrating an outline of a configuration of a control system of the robot system of FIG. 1.
Figure 4:
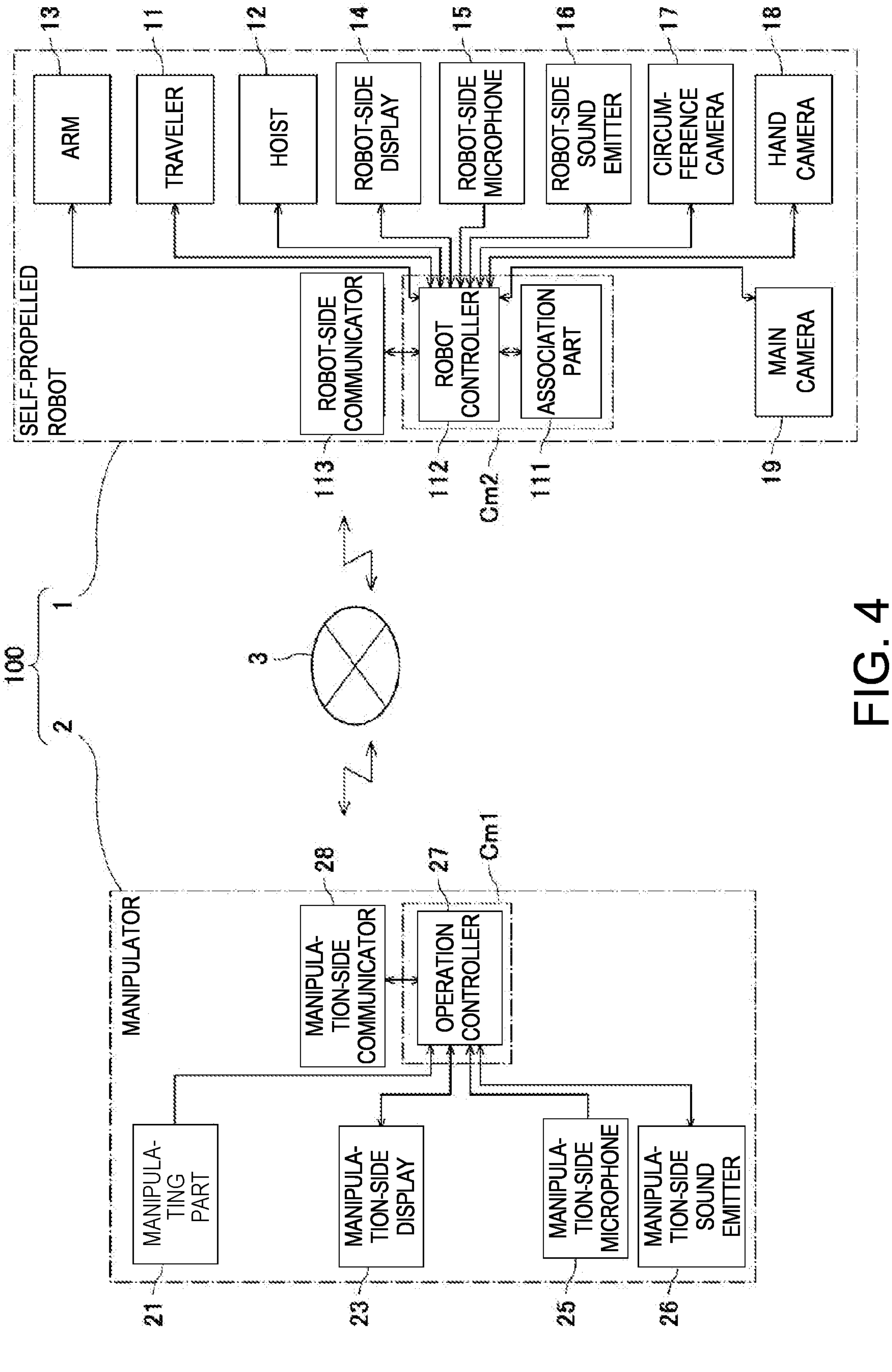
FIG. 4 is a functional block illustrating details of the configuration of the control system of the robot system of FIG. 3.

FIG. 3 is a schematic view illustrating an outline of a configuration of a control system of the robot system 100 of FIG. 1. FIG. 4 is a functional block illustrating details of the configuration of the control system of the robot system 100 of FIG. 3.

Referring to FIG. 3, in the robot system 100, the first to third manipulators 2A-2C are connected with the self-propelled robot 1 via the data communication network 3.

Referring to FIG. 4, the self-propelled robot 1 and the manipulator 2 which represents the first to third manipulators 2A-2C are illustrated in FIG. 4. That is, the first to third manipulators 2A-2C are configured substantially similarly to each other.

Below, the configuration of the control system of the robot system 100 is described dividedly into "a fundamental configuration" and "a configuration about association of the manipulators 2A-2C with the self-propelled robot 1."

<Fundamental Configuration>

{Configuration on Manipulator 2 Side}

The manipulator 2 includes the manipulating part 21, the manipulation-side display 23, the manipulation-side microphone 25, the manipulation-side sound emitter 26, the operation controller 27, and the manipulation-side communicator 28.

The manipulating part 21 outputs to the operation controller 27 a key operation signal according to operation of the operation keys 29 by the operators P1-P3.

The manipulation-side display 23 displays an image according to an image display signal inputted from the operation controller 27. In detail, according to the main image signal, the hand image signal, the circumference image signal, and association table information, a main image, a hand image, a circumference image, and an association table are displayed, respectively. Further, the manipulation-side display 23 outputs to-be-operated part specifying information (described later in detail).

The manipulation-side microphone 25 acquires voice of the operator P1, and outputs it to the operation controller 27 as an operator voice signal.

The manipulation-side sound emitter 26 emits voice according to a conversation partner voice signal inputted from the operation controller 27.

The operation controller 27 generates a traveler manipulation signal, a hoist manipulation signal, and an arm manipulation signal according to the key operation signal inputted from the manipulating part 21, and outputs them to the manipulation-side communicator 28. For example, these manipulation signals are generated based on assignment information on "operation of the traveler of the self-propelled robot, operation of the hoist, and operation of the arm" to "a combination of key operation signals of the group of operation keys 29" set beforehand.

Further, the operation controller 27 outputs the operator voice signal inputted from the manipulation-side microphone 25 to the manipulation-side communicator 28. Further, the operation controller 27 outputs the to-be-operated part specifying information inputted from the manipulation-side display 23 to the manipulation-side communicator 28.

On the other hand, the operation controller 27 suitably generates an image display signal based on the circumference image signal, the hand image signal, the main image signal, and the association table information which are inputted from the manipulation-side communicator 28, and outputs them to the manipulation-side display 23.

Further, the operation controller 27 outputs a conversation partner voice signal inputted from the manipulation-side communicator 28 to the manipulation-side sound emitter 26.

The manipulation-side communicator 28 is comprised of a communication apparatus capable of data communications. The manipulation-side communicator 28 converts into communication data (packet) the traveler manipulation signal, the hoist manipulation signal, the arm manipulation signal, the operator voice signal, and the to-be-operated part specification signal which are inputted from the operation controller 27, and transmits them to the robot-side communicator 113.

Further, the manipulation-side communicator 28 receives communication data of the circumference image signal, the hand image signal, the main image signal, the association table information, and the conversation partner voice signal from the robot-side communicator 113, converts them back to the circumference image signal, the hand image signal, the main image signal, the association table information, and the conversation partner voice signal, and outputs them to the operation controller 27.

Here, these communications are performed via the data communication network 3.

Here, the operation controller 27 is comprised of the arithmetic circuit module Cm2 having the processor Pr2 and the memory Me2. The operation controller 27 is a functional blocks realized in this arithmetic circuit module Cm2 by the processor Pr2 executing a control program stored in the memory Me2. In detail, the arithmetic circuit module Cm2 is comprised of a microcontroller, an MPU, an FPGA (Field Programmable Gate Array), a PLC (Programmable Logic Controller), etc., for example. These may be comprised of a sole arithmetic circuit module which performs a centralized control, or may be comprised of a plurality of arithmetic circuit modules which perform a distributed control.

{Configuration on Self-Propelled Robot 1 Side}

The self-propelled robot 1 includes the traveler 11, the hoist 12, the arm 13, the robot-side display 14, the robot-side microphone 15, the robot-side sound emitter 16, the circumference cameras 17, the hand camera 18, the main camera 19, the association part 111, the robot controller 112, and the robot-side communicator 113.

The robot-side communicator 113 is comprised of a communication apparatus capable of data communications. The robot-side communicator 113 receives the communication data of the traveler manipulation signal, the hoist manipulation signal, the arm manipulation signal, the operator voice signal, and the to-be-operated part specifying information from the manipulation-side communicator 28, converts them back to the traveler manipulation signal, the hoist manipulation signal, the arm manipulation signal, the operator voice signal, and the to-be-operated part specifying information, and outputs them to the robot controller 112.

Further, the robot-side communicator 113 converts into communication data (packet) the circumference image signal, the hand image signal, the main image signal, the association table information, and the conversation partner voice signal which are inputted from the robot controller 112, and transmits them to the manipulation-side communicator 28.

The robot controller 112 once outputs to an association part 111 the traveler manipulation signal, the hoist manipulation signal, and the arm manipulation signal which are inputted from the robot-side communicator 113, and outputs to the traveler 11, the hoist 12, and the arm 13, checked traveler manipulation signal, checked hoist manipulation signal, and checked arm manipulation signal which are inputted from the association part 111, respectively.

Further, the robot controller 112 outputs to the association part 111 the to-be-operated part specifying information inputted from the robot-side communicator 113.

Further, the robot controller 112 suitably generates the image display signal, and outputs it to the robot-side display 14.

Further, the robot controller 112 outputs the operator voice signal inputted from the robot-side communicator 113 to the robot-side sound emitter 16. In this case, for example, the robot controller 112 may display on the robot-side display 14 an image of a person wearing a uniform according to a given work site (for example, an illustration image), and may convert the operator voice signal into a signal of voice which matches with the given person (for example, voice which corresponds to the sex of the employee, and is soft).

Further, the robot controller 112 outputs to the robot-side communicator 113 the circumference image signal inputted from the circumference cameras 17, the hand image signal inputted from the hand camera 18, and the main image signal inputted from the main camera 19.

The traveler 11, the hoist 12, and the arm 13 operate according to the checked traveler manipulation signal, the checked hoist manipulation signal, and the checked arm manipulation signal which are inputted from the robot controller 112, respectively.

The robot-side display 14 displays an image according to the image display signal inputted from the robot controller 112.

The robot-side microphone 15 acquires the voice of the conversation partner (for example, a customer), and outputs it to the robot controller 112 as the conversation partner voice signal.

The robot-side sound emitter 16 emits the voice according to the operator voice signal inputted from the robot controller 112. The robot-side sound emitter 16 is comprised of a speaker, for example.

The circumference cameras 17 image the environment around the self-propelled robot 1, and output it to the robot controller 112 as the circumference image signal.

The hand camera 18 images the environment (scenery) of the hand of the second robotic arm 121B, and outputs it to the robot controller 112 as the hand image signal. One example of the environment of the hand of the second robotic arm 121B is an object which the hand 124B is about to grip.

The main camera 19 images the field of view equivalent to a field of view of a standing person, and outputs it to the robot controller 112 as the main image signal. When the self-propelled robot 1 faces the conversation partner, an image of the conversation partner exists in the main image.

Here, the robot controller 112 and the association part 111 are comprised of the arithmetic circuit module Cm1 having the processor Pr1 and the memory Me1. The robot controller 112 and the association part 111 are functional blocks realized in this arithmetic circuit module Cm1 by the processor Pr1 executing a control program stored in the memory Me1. In detail, this arithmetic circuit module Cm1 is comprised of a microcontroller, an MPU, an FPGA (Field Programmable Gate Array), a PLC (Programmable Logic Controller), etc., for example. These may be comprised of a sole arithmetic circuit module which performs a centralized control, or may be comprised of a plurality of arithmetic circuit modules which perform a distributed control.

The functions of the elements disclosed herein may be performed using circuitry or processing circuitry including a general-purpose processor, a dedicated processor, an integrated circuit, ASIC (Application Specific Integrated Circuits), conventional circuitry, and/or a combination thereof, which are configured or programmed to execute the disclosed functions. Since the processor includes transistors or other circuitry, it is considered to be processing circuitry or circuitry. In the present disclosure, "unit" or "part" is hardware which performs the listed function, or hardware programmed to perform the listed function. The hardware may be hardware disclosed herein, or may be other known hardware programmed or configured to perform the listed function. When the hardware is a processor considered to be a kind of circuitry, the "unit" or the "part" is a combination of hardware and software, and the software is used for the configuration of the hardware and/or the processor.

<Configuration about Association of Manipulators 2A-2C with Self-propelled Robot 1>

{Configuration of Setup of Association}

FIG. 5A is an association table illustrating association between the manipulators 2 of the group of manipulators 120 and the to-be-operated parts of the self-propelled robot 1, and illustrates a state where no association is established. FIG. 5B is an association table illustrating the association between the manipulators 2 of the group of manipulators 120 and the to-be-operated parts of the self-propelled robot 1, and illustrates a state where the first manipulator 2A is associated with the to-be-operated part of the self-propelled robot 1. FIG. 5C is an association table illustrating the association between the manipulators 2 of the group of manipulators 120 and the to-be-operated parts of the self-propelled robot 1, and illustrates a state where the first manipulator 2A and the second manipulator 2B are associated with the to-be-operated parts of the self-propelled robot 1. FIG. 5D is an association table illustrating the association of the manipulators 2 of the group of manipulators 120 and the to-be-operated parts of the self-propelled robot 1, and illustrates a state where the first manipulator 2A, the second manipulator 2B, and the third manipulator 2C are associated with the to-be-operated parts of the self-propelled robot 1. In these drawings, a "+" symbol indicates that it is associated, and a "−" symbol indicates that an association is forbidden.

For example, the association part 111 associates the first to third manipulators 2A-2C of the group of manipulators 120 with the traveler 11, the hoist 12, and the arm 13 of the self-propelled robot 1 as follows. Here, the first to third manipulators 2A-2C are operated by the operators P1-P3, respectively.

Referring to FIGS. 3, 4, and 5A, when a communication between the first to third manipulators 2A-2C and the self-propelled robot 1 is established, the association part 111 generates the association table 114 in a state where no association is established as illustrated in FIG. 5A, and outputs it as the association table information. Then, the association table 114 in this state where no association is established is displayed on the manipulation-side displays 23 of the first to third manipulators 2A-2C.

Here, for example, first, the operator P1 selects the arm 13 as a target to-be-operated part, and touches the corresponding part of the association table 114. Then, this touch information is transmitted to the association part 111 as the to-be-operated part specifying information, and the association part 111 generates the association table 114 illustrated in FIG. 5B in a state where the first manipulator 2A is associated with the arm 13 of the self-propelled robot 1, and other manipulators 2B and 2C are forbidden to be associated with the arm 13, and outputs it as the association table information. Then, this association table 114 is displayed on the manipulation-side display 23 of each of the first to third manipulators 2A-2C.

Next, for example, second, the operator P2 selects the traveler 11 as a target to-be-operated part, and touches the corresponding part of the association table 114. Then, this touch information is transmitted to the association part 111 as the to-be-operated part specifying information, and the association part 111 generates the association table 114 in the state illustrated in FIG. 5C where the second manipulator 2B is further associated with the traveler 11 of the self-propelled robot 1, and other manipulators 2A and 2C are forbidden to be associated with the traveler 11, and outputs it as the association table information. Then, this association table 114 is displayed on the manipulation-side display 23 of each of the first to third manipulators 2A-2C.

Next, for example, third, the operator P3 selects the hoist 12 as a target to-be-operated part, and touches the corresponding part of the association table 114. Then, this touch information is transmitted to the association part 111 as the to-be-operated part specifying information, and the association part 111 generates the association table 114 illustrated in FIG. 5D in the state where the third manipulator 2C is further associated with the hoist 12 of the self-propelled robot 1, and other manipulators 2A and 2B are forbidden to be associated with the hoist 12, and outputs it as the association table information. Then, this association table 114 is displayed on the manipulation-side display 23 of each of the first to third manipulators 2A-2C.

Here, as described above, the association part 111 forbids that the arm 13, the hoist 12, and the traveler 11 of the self-propelled robot 1 are overlappingly associated with the first to third manipulators 2A-2C. Therefore, in the above-described case, when the second manipulator 2B or the third manipulator 2C specifies the arm 13 as a to-be-operated part after the first manipulator 2A specifies the arm 13 as a to-be-operated part, the association part 111 refuses this specification. A similar process can be applied to the case in which other to-be-operated parts are overlappingly specified.

However, the first to third manipulators 2A-2C may also specify two or more to-be-operated parts of the self-propelled robot 1 as target to-be-operated parts. Here, the first to third manipulators 2A-2C may also specify two or all of the arm 13, the hoist 12, and the traveler 11 of the self-propelled robot 1 as operation targets (to-be-operated parts).

The association part 111 stores in a memory the association table (association information) 114 of FIG. 5D where the association is finished.

Therefore, the association of the manipulators 2A-2C with the arm 13, the hoist 12, and the traveler 11 of the self-propelled robot 1 is set.

Further, the operators P1-P3 can know the association of the manipulators 2A-2C with the arm 13, the hoist 12, and the traveler 11 of the self-propelled robot 1 based on the association table 114 of FIG. 5D displayed on the manipulation-side display 23, where the association is finished.

{Configuration of Exclusive Operation}

The two or more manipulators (here, the first to third manipulators 2A-2C) are each assigned with the identification symbol.

The operation controller 27 of the manipulator (2A-2C) gives the identification symbol of the manipulator (2A-2C) to which it belongs, to the traveler manipulation signal, the hoist manipulation signal, and the arm manipulation signal which are generated, and outputs them. The association part 111 of the self-propelled robot 1 compares the identification symbol of each of the traveler manipulation signal, the hoist manipulation signal, and the arm manipulation signal which are received from the robot controller 112, with the association table 114 of FIG. 5D, and checks whether the identification symbols of the traveler manipulation signal, the identification symbol of the hoist manipulation signal, and the identification symbol of the arm manipulation signal are the identification symbols of the manipulators 2A-2C associated with the traveler 11, the hoist 12, and the arm 13, respectively. If this check result is affirmative, the association part 111 sends the received traveler manipulation signal, hoist manipulation signal, and arm manipulation signal to the robot controller 112 as the checked traveler manipulation signal, the checked hoist manipulation signal, and the checked arm manipulation signal, respectively. Therefore, the traveler 11, the hoist 12, and the arm 13 operate according to the checked traveler manipulation signal, the checked hoist manipulation signal, and the checked arm manipulation signal, respectively.

On the other hand, if the above-described check result is negative, the association part 111 discards the negative traveler manipulation signal, hoist manipulation signal, and arm manipulation signal, assigns the identification symbols corresponding to these signals, and outputs an error message as the association table information. Then, this error message is displayed on the manipulation-side display 23 of the relevant manipulator (2A-2C) (since other, irrelevant manipulator (2A-2C) is assigned with the identification symbol of other manipulator in the association table information, it is not processed). Therefore, the operators P1-P3 can know the error of operation, and can correct it.

According to the above configuration, two or more manipulators (here, the first to third manipulators 2A-2C) can manipulate the to-be-operated part(s) of the self-propelled robot 1 (here, the traveler 11, the hoist 12, and the arm 13) dividedly (i.e., exclusively).

[Operation (Robot Working Method)]

Figures 6, 7:
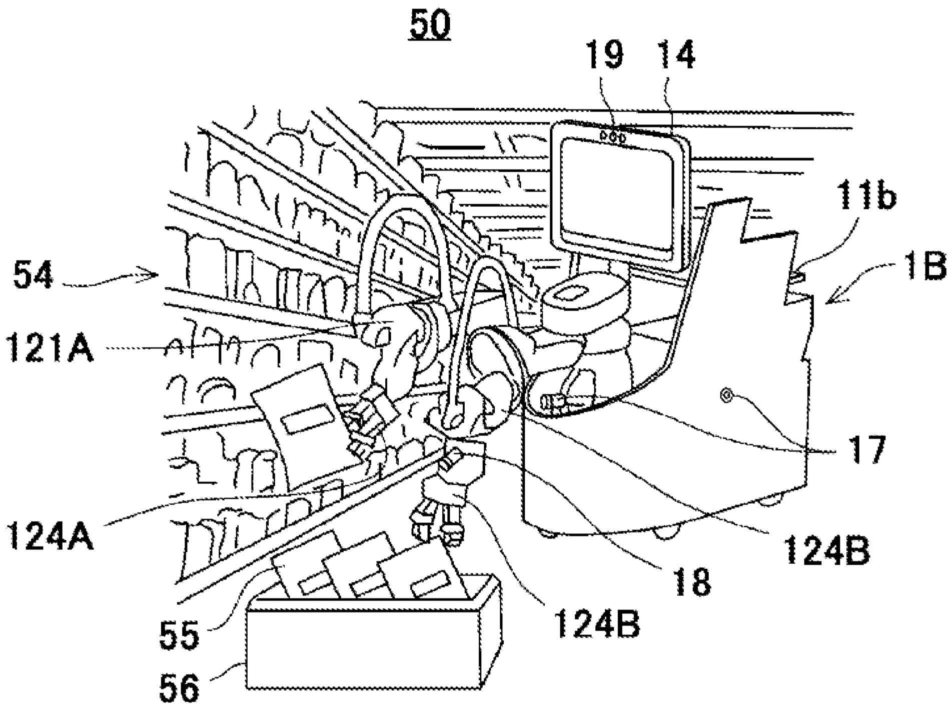
FIG. 6 is a view illustrating operation of the robot system according to Embodiment 1 of the present disclosure, and is a schematic view illustrating a situation in which the self-propelled robot picks products in a warehouse of a supermarket.
FIG. 7 is an association table illustrating association of manipulators of a group of manipulators with to-be-operated parts of a self-propelled robot in a robot system of Embodiment 2 of the present disclosure, and illustrates a state where the first manipulator and the second manipulator are associated with the to-be-operated parts of the self-propelled robot.

Next, operation of the robot system 100 (robot working method) configured as above is described. FIG. 6 is a view illustrating the operation of the robot system 100 according to Embodiment 1, and is a schematic view illustrating a situation in which the self-propelled robot 1 picks the products 55 in a warehouse 50 of a supermarket.

Referring to FIG. 6, the self-propelled robot 1 is disposed in the warehouse 50 of the supermarket. The operators P1-P3 respectively operate the first to third manipulators 2A-2C to dividedly operate the arm 13, the traveler 11, and the hoist 12 of the self-propelled robot 1. According to this operation, the self-propelled robot 1 operates as follows, for example.

The self-propelled robot 1 picks the products 55 in the warehouse 50, while moving along a product shelf 54. In the process, it puts an empty product container 56, which is loaded on the shelf 11*b*, on the floor in front of the product shelf 54, takes out desired products 55 from the product shelf 54 one by one, and accommodates them in the product container 56 one by one. When the product container 56 becomes full, it is loaded on the shelf 11*b*.

Here, the self-propelled robot 1 grips the products 55 alternately by pair of hands 124A and 124B.

The second manipulator 2B operated by the operator P2 occupies the operation of the traveler 11 of the self-propelled robot 1. The operator P2 operates the second manipulator 2B, while monitoring the circumference by using the circumference images from the circumference cameras 17 displayed on the manipulation-side display 23 of the second manipulator 2B, to move the self-propelled robot 1.

Further, the first manipulator 2A operated by the operator P1 occupies the operation of the arm 13 of the self-propelled robot 1. The operator P1 checks the product shelf 54 where the products 55 are displayed, by using the main image from the main camera 19 displayed on the manipulation-side display 23 of the first manipulator 2A. Then, the operator P1 puts down the product container 56 from the shelf 11*b* on the floor, while checking a gripping position of the product container 56 by using the hand image from the hand camera 18 displayed on the manipulation-side display 23 of the first manipulator 2A, and makes the robot grip the product 55, while checking the gripping position of the product 55 by using the hand image from the hand camera 18.

The third manipulator 2C operated by the operator P3 occupies the operation of the hoist 12 of the self-propelled robot 1. The operator P3 operates the third manipulator 2C, while looking at the movement of the pair of hands 124A and 124B of the self-propelled robot 1 by using the main image from the main camera 19 displayed on the manipulation-side display 23 of the third manipulator 2C, to raise and lower the hoist 12, thereby assisting the extraction of the products 55 and raising and lowering of the product container 56 by the self-propelled robot 1.

Thus, according to the robot system 100 of Embodiment 1, the first to third manipulators 2A-2C can operate the traveler 11, the hoist 12, and the arm 13 of the self-propelled robot 1 dividedly. Therefore, it can suitably perform the picking work of the products in which the products 55 are taken out by the arm 13, while making the self-propelled robot 1 travel.

Embodiment 2

Embodiment 2 of the present disclosure is different from Embodiment 1 in the features which will be described below, and is the same as Embodiment 1 in other features. Below, the differences are described.

Figure 8:
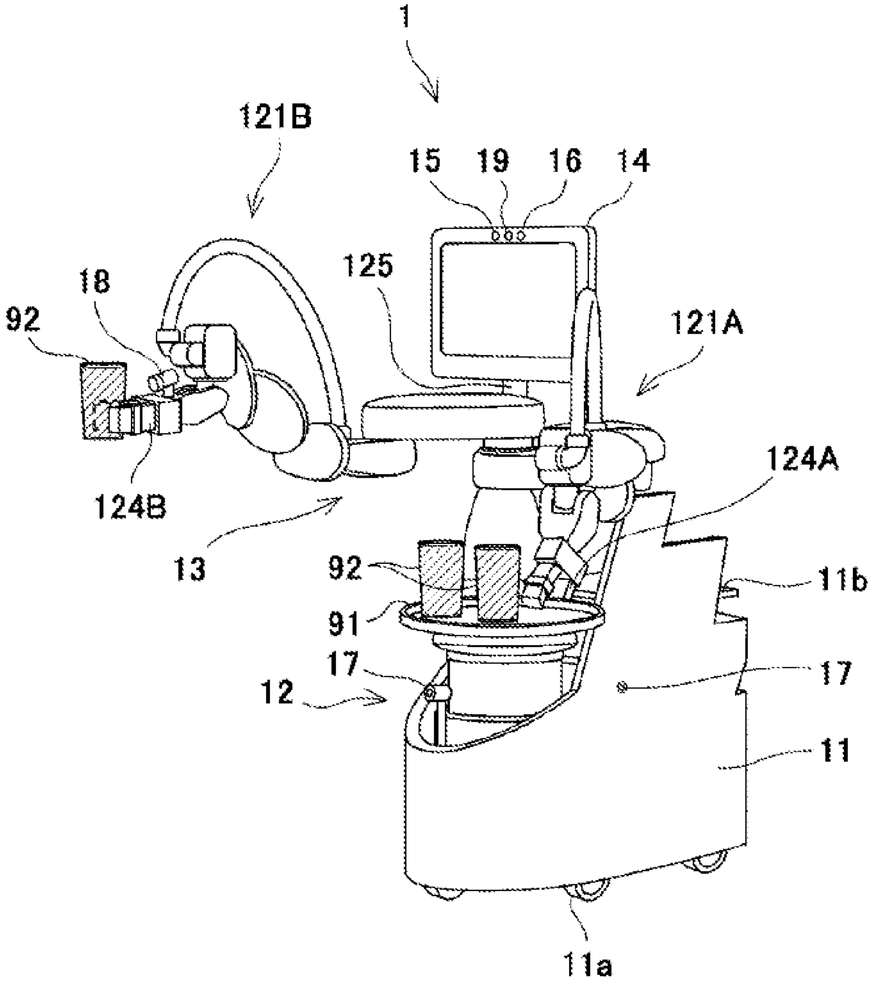
FIG. 8 is a view illustrating operation of the robot system according to Embodiment 2 of the present disclosure, and is a schematic view illustrating a situation in which the self-propelled robot travels by itself, while holding glasses containing beer in hands of the both robotic arms.

FIG. 7 is an association table illustrating association of the manipulators 2 of the group of manipulators 120 with the to-be-operated parts of the self-propelled robot 1 in a robot system 100 of Embodiment 2, and is an association table 114 illustrating a state where the first manipulator 2A and the second manipulator 2B are associated with the to-be-operated parts of the self-propelled robot 1. FIG. 8 is a view illustrating operation of the robot system 100 according to Embodiment 2, and is a schematic view illustrating a situation in which the self-propelled robot 1 travels by itself, while holding glasses 92 containing beer in the hands 124A and 124B of the both robotic arms 121A and 121B.

Referring to FIG. 7, in Embodiment 2, the first manipulator 2A is associated with the arm 13 of the self-propelled robot 1, and the second manipulator 2B is associated with the hoist 12 and the traveler 11 of the self-propelled robot 1. Therefore, the third manipulator 2C is not associated with any to-be-operated part. This is because the necessity of operating the hoist 12 is so much less in Embodiment 2.

For example, the self-propelled robot 1 holds by the hand 124A of the first robotic arm 121A a tray 91 where two glasses 92 containing beer are placed, and holds one glass 92 containing beer directly by the hand 124B of the second robotic arm 121B. Then, it travels to a destination in this state. Beer is almost fully poured in the three glasses 92. Therefore, the self-propelled robot 1 has to travel, while preventing the shake so that beer is not spilled out of the three glasses 92 held by both the hands 124A and 124B.

However, in Embodiment 2, the operator P1 manipulates the arm 13 of the self-propelled robot 1 by the first manipulator 2A, and the operator P2 manipulates the hoist 12 and the traveler 11 of the self-propelled robot 1 by the second manipulator 2B. Therefore, the operator P2 can concentrate on manipulating the hoist 12 and the traveler 11 so that the self-propelled robot 1 does not shake, and the operator P1 can concentrate on manipulating the arm 13 so that beer is not spilled out of the three glasses 92. Note that, when making the self-propelled robot 1 travel, the self-propelled robot 1 suitably has a conversation with a customer, as needed. This conversation is performed using the manipulation-side display 23, the manipulation-side microphone 25, and the manipulation-side sound emitter 26 of the first manipulator 2A, and the robot-side microphone 15, the robot-side sound emitter 16, and the main camera 19 of the self-propelled robot 1.

As a result, the self-propelled robot 1 can travel suitably so that beer is not spilled out of the three glasses 92 held by both the hands 124A and 124B.

Embodiment 3

According to Embodiment 3 of the present disclosure, the first to third manipulators 2A-2C are configured to be manipulators for exclusive use which are capable of manipulating only one of the to-be-operated parts of the self-propelled robot 1. Therefore, the association part 111 of the self-propelled robot 1 is omitted. Other features are similar to Embodiment 1.

Since the first to third manipulators 2A-2C are capable of exclusively operating each of the traveler 11, the hoist 12, and the arm 13 of the self-propelled robot 1 also in such Embodiment 3, the product picking work in which the products 55 are taken out by the arms 13, while the self-propelled robot 1 travels, can be performed suitably.

Embodiment 4

Embodiment 4 of the present disclosure is different from Embodiment 1 in the features which will be described below, and is the same as Embodiment 1 in other features. Below, the differences are described.

Referring to FIG. 1, the group of manipulators 120 include manipulators 2A-2C which are capable of operating the to-be-operated parts 11-13 of the self-propelled robot 1 by the operators P1-P3.

In detail, referring to FIG. 4, the operation controller 27 includes a given automatic operation program, and when a manipulation signal indicative of switching the manual operation to the automatic operation is inputted from a manual operation part 21, it outputs a manipulation signal according to the given automatic operation program to the manipulation-side communicator 28.

Therefore, the self-propelled robot 1 is automatically operated by the manipulators 2A-2C.

According to such Embodiment 4, it can reduce the number of operators P1-P3.

OTHER EMBODIMENTS

In any of Embodiments 1-3, the association part 111 may be disposed at a server connected to the data communication network 3.

Further, in Embodiment 1 or 2, each of the two robotic arms 121A and 121B may be operated exclusively. Moreover, further other parts of the self-propelled robot 1 may be operated exclusively. For example, each of the hands 124A and 124B may be operated exclusively.

As described above, in the above embodiments of the present disclosure, the self-propelled robot 1 further includes the hoist 12 which raises and lowers the arm 13, the arm 13 is provided to the traveler 11 via the hoist 12, and the group of manipulators 120 include the manipulator 2 which is capable of exclusively operating the hoist 12 of the self-propelled robot 1.

Therefore, the group of manipulators 120 may include two or three manipulators 2A-2C. If the group of manipulators 120 include three manipulators, since three operators can operate the traveler 11, the hoist 12, and the arm 13 of the self-propelled robot 1 mutually dividedly, the work in which the robotic arms 121A and 121B perform a work, while the self-propelled robot 1 travels, can be performed more suitably.

Further, the arm 13 includes the two robotic arms 121A and 121B, and the group of manipulators 120 include the manipulators 2A-2C which are capable of exclusively operating the two robotic arms 121A and 121B of the arm 13.

Therefore, since two operators can operate the two robotic arms 121A and 121B dividedly, the work which is performed by the arm 13 can be performed more suitably.

Further, the manipulators 2A-2C included in the group of manipulators 120 are each capable of exclusively operating at least two of the traveler 11 and the two robotic arms 121A and 121B of the arm 13 of the self-propelled robot 1.

Therefore, depending on the work, operators P1-P3 who dividedly perform the work can be reduced in the number.

Further, the group of manipulators 120 includes the manipulators 2A-2C which are capable of operating the to-be-operated parts of the self-propelled robot 1 by the operators, and the manipulators 2A-2C which are capable of automatically operating the to-be-operated parts of the self-propelled robot 1.

Therefore, the operators P1-P3 can further be reduced in the number.

Further, the robot system 100 includes the association part which associates one of the to-be-operated parts 11-13 of the self-propelled robot 1 specified by one manipulator 2 included in the group of manipulators 120 with the specified manipulators 2A-2C, and sends only the manipulation signals outputted from the associated manipulators 2A-2C to the associated to-be-operated parts 11-13, so that the manipulation signals outputted from all the manipulators 2A-2C included in the group of manipulators 120 are associated with the manipulation signals which are received by all of the to-be-operated parts 11-13 of the self-propelled robot 1.

Therefore, since only the manipulation signals outputted from the associated manipulators 2A-2C are sent to the associated to-be-operated parts 11-13, the associated manipulators 2A-2C can exclusively operate the associated to-be-operated parts 11-13. Then, since such an association is carried out to the manipulation signals outputted from all the manipulators 2A-2C included in the group of manipulators 120, and the manipulation signals received by all the to-be-operated parts 11-13 of the self-propelled robot 1, the two or more arbitrary manipulators 2A-2C included in the group of manipulators 120 can exclusively operate any two or more of the to-be-operated parts 11-13 of the self-propelled robot 1, respectively.

SUMMARY

A robot system 100 according to the present disclosure includes a self-propelled robot 1 having an autonomously travelable carriage 11 and at least one robotic arm 121A, 121B mounted on the carriage 11, and a plurality of manipulation consoles 2A, 2B, 2C that manipulate the self-propelled robot 1. The plurality of manipulation consoles 2A, 2B, 2C include a first manipulation console 2 that exclusively operates some of a plurality of to-be-operated parts 11, 12, 13 of the self-propelled robot 1 including the carriage 11 and the at least one robotic arm 121A, 121B, and a second manipulation console 2 that exclusively operates some or all of the remainder of the plurality of to-be-operated parts 11, 12, 13.

Further, a robot working method according to the present disclosure is a robot working method using a self-propelled robot 1 having an autonomously travelable carriage 11 and at least one robotic arm 121A, 121B mounted on the carriage 11, and a plurality of manipulation consoles 2A, 2B, 2C that manipulate the self-propelled robot 1, including a first manipulation console 2 and a second manipulation console 2, and includes exclusively operating, by the first manipulation console 2, some of a plurality of to-be-operated parts 11, 12, 13 of the self-propelled robot 1 including the carriage 11 and the at least one robotic arm 121A, 121B, and exclusively operating, by the second manipulation console 2, some or all of the remainder of the plurality of to-be-operated parts 11, 12, 13.

According to the robot system 100 and the robot working method described above, by each of the plurality of operators operating the manipulation console 2, the operators can dividedly manipulate the to-be-operated parts (i.e., the traveler 11, the hoist 12, and the arm 13 including the at least one robotic arm 121A, 121B) of the self-propelled robot 1. Therefore, the work in which the self-propelled robot 1 operates the robotic arms 121A and 121B, while the self-propelled robot 1 travels using the carriage 11, can be performed more suitably.

In the above-described robot system 100, the at least one robotic arm 121A, 121B may include a first robotic arm 121A exclusively operated by the first manipulation console 2 and a second robotic arm 121B exclusively operated by the second manipulation console 2.

Further, in the above-described robot system 100, the at least one robotic arm 121A, 121B may include a first robotic arm 121A and a second robotic arm 121B, and two of the carriage 11, the first robotic arm 121A, and the second robotic arm 121B may be exclusively operated by one of the first manipulation console 2 and the second manipulation console 2.

In the above-described robot system 100, the plurality of manipulation consoles 2A, 2B, 2C may include a manual operation console (i.e., the manipulation console 2 for manual operation of the self-propelled robot 1) that allows an operator to manually operate the plurality of to-be-operated parts 11, 12, 13, and an automatic operation console (i.e., the manipulation console 2 for automatic operation of the self-propelled robot 1) that automatically operates the plurality of to-be-operated parts 11, 12, 13.

In the above-described robot system 100, wherein the self-propelled robot 1 has association circuitry 111 including a processor and a memory, an association circuitry 111 (Cm1) may be adapted to, by a processor Pr1 executing a given program stored in a memory Me1, acquire from each of the plurality of manipulation consoles 2, to-be-operated part specifying information that specifies an operation target among the plurality of to-be-operated parts 11, 12, 13, and generate association information in which each of the plurality of to-be-operated parts 11, 12, 13 is associated with any one of the plurality of manipulation consoles 2, and store the association information.

Thus, by using the manipulation console 2, the operators can specify the to-be-operated parts 11, 12, 13 which are the respective operation targets of the plurality of manipulation consoles 2.

Further, in the above-described robot system 100, the self-propelled robot 1 may have a robot controller 112 that controls operation of the self-propelled robot 1. The association circuitry 111 may be adapted to, by the processor Pr1 executing a given program stored in the memory Me1, acquire a manipulation signal for a first to-be-operated part among the plurality of to-be-operated parts 11, 12, 13, and an identification symbol of the manipulation console 2 that outputted the manipulation signal, refer to the association information, and check that the identification symbol corresponds to that of the manipulation console 2 associated with the first to-be-operated part, and when the check is positive, send the manipulation signal to the robot controller 112 as a checked manipulation signal for the first to-be-operated part, and when the check is negative, discard the manipulation signal. The robot controller 112 may be adapted to operate the first to-be-operated part according to the checked manipulation signal received.

Thus, each of the plurality of the to-be-operated parts 11, 12, 13 is operable only by the operation inputted from the associated manipulation console 2, which prevents erroneous operations. Further, the operators can know the error of operation, and can correct it.

It is apparent for the person skilled in the art that many improvements and other embodiments are possible from the above description. Therefore, the above description is to be interpreted only as illustration.

The functionality of the elements disclosed herein may be implemented using circuitry or processing circuitry which includes general-purpose processors, special-purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or other known hardware which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A robot system, comprising:

a self-propelled robot having an autonomously travelable carriage and at least two robotic arms mounted on the carriage; and a plurality of manipulators, each including at least a processor and a memory, that manipulate the self-propelled robot, the plurality of manipulators including at least:

a first manipulator that exclusively operates some of a plurality of to-be-operated parts of the self-propelled robot, the plurality of to-be-operated parts including at least the carriage and the at least two robotic arms; and a second manipulator that exclusively operates at least two of the remainder of the plurality of to-be-operated parts simultaneously with the operations of the first manipulator, wherein the exclusive and simultaneous operation by the first manipulator and the second manipulator is a preset allocation based on association information, stored in a memory of the self-propelled robot, that associates each of the plurality of to-be-operated parts with the respective manipulator, the preset allocation being fixed for an operation of the self-propelled robot, and is changeable after the operation of the self-propelled robot prior to a subsequent operation of the self-propelled robot.

2. The robot system of claim 1, wherein the at least two robotic arm includes a first robotic arm exclusively operated by the first manipulator and a second robotic arm exclusively operated by the second manipulator while the second manipulator also exclusively operates at least one more of the remainder of the plurality of to-be-operated parts.

3. The robot system of claim 1, wherein the plurality of manipulators include a manual operator that allows an operator to manually operate the plurality of to-be-operated parts, and an automatic operator that automatically operates the plurality of to-be-operated parts.

4. The robot system of claim 1, wherein the self-propelled robot has association circuitry including a processor and the memory, the association circuitry being adapted to, by the processor executing a given program stored in the memory:

acquire from each of the plurality of manipulators, to-be-operated parts specifying information that specifies at least one operation target among the plurality of to-be-operated parts; and generate the association information in which each of the plurality of to-be-operated parts is associated with any one of the plurality of manipulators, and store the association information.

5. The robot system of claim 4, wherein the self-propelled robot has a robot controller that controls operation of the self-propelled robot, wherein the association circuitry is adapted to, by the processor executing a given program stored in the memory:

acquire a manipulation signal for a first to-be-operated part among the plurality of to-be-operated parts, and an identification symbol of the manipulator that outputted the manipulation signal;

refer to the association information, and check that the identification symbol corresponds to that of the manipulator associated with the first to-be-operated part;

when the check is positive, send the manipulation signal to the robot controller as a checked manipulation signal for the first to-be-operated part, and when the check is negative, discard the manipulation signal; and repeat the acquisition of the manipulation signal, the reference to the association information, and the check of the identification symbol for each of the remaining to-be-operated parts among the plurality of to-be-operated parts, wherein the robot controller is adapted to operate each of the to-be-operated parts according to the checked manipulation signal received.

6. The robot system of claim 1, wherein the plurality of manipulators further includes a third manipulator, and wherein the third manipulator exclusively operates a to-be-operated part, which is not operated by either the first manipulator or the second manipulator, simultaneously with the operations of the first manipulator and the second manipulator.

7. The robot system of claim 1, wherein the self-propelled robot further includes a hoist positioned between the autonomously travelable carriage and the at least two robotic arms, wherein the plurality of manipulators further includes a third manipulator, and wherein the third manipulator exclusively operates the hoist, simultaneously with the operations of the first manipulator and the second manipulator.

8. A robot working method using a self-propelled robot having an autonomously travelable carriage and at least two robotic arms mounted on the carriage, and a plurality of manipulators, each including at least a processor and a memory, that manipulate the self-propelled robot, the plurality of manipulators including at least a first manipulator and a second manipulator, the method comprising:

exclusively operating, by the first manipulator, some of a plurality of to-be-operated parts of the self-propelled robot, the plurality of to-be-operated parts including at least the carriage and the at least two robotic arms; and exclusively operating, by the second manipulator, at least two of the remainder of the plurality of to-be-operated parts simultaneously with the operations of the first manipulator, wherein the exclusive and simultaneous operation by the first manipulator and the second manipulator is a preset allocation based on association information, stored in a memory of the self-propelled robot, that associates each of the plurality of to-be-operated parts with the respective manipulator, the preset allocation being fixed for an operation of the self-propelled robot, and is changeable after the operation of the self-propelled robot prior to a subsequent operation of the self-propelled robot.

9. The robot method of claim 8, wherein the plurality of manipulators further includes a third manipulator, and wherein the third manipulator exclusively operates a to-be-operated part, which is not operated by either the first manipulator or the second manipulator, simultaneously with the operations of the first manipulator and the second manipulator.

10. The robot method of claim 8, the self-propelled robot further includes a hoist positioned between the autonomously travelable carriage and the at least two robotic arms, wherein the plurality of manipulators further includes a third manipulator, and wherein the third manipulator exclusively operates the hoist simultaneously with the operations of the first manipulator and the second manipulator.

11. A robot system, comprising:

a self-propelled robot having an autonomously travelable carriage and at least two robotic arms mounted on the carriage; and a plurality of manipulators, each including at least a processor and a memory, that manipulate the self-propelled robot, the plurality of manipulators including at least:

a first manipulator that exclusively operates the at least two robotic arms; and a second manipulator that exclusively operates the travelable carriage simultaneously with the operations of the first manipulator, wherein the exclusive and simultaneous operation by the first manipulator and the second manipulator is a preset allocation based on association information, stored in a memory of the self-propelled robot, that associates each of the plurality of to-be-operated parts with the respective manipulator, the preset allocation being fixed for an operation of the self-propelled robot, and is changeable after the operation of the self-propelled robot prior to a subsequent operation of the self-propelled robot.

12. The robot system of claim 11, wherein the self-propelled robot further includes a hoist positioned between the autonomously travelable carriage and the at least two robotic arms, wherein the plurality of manipulators further includes a third manipulator, and wherein the third manipulator exclusively operates the hoist, simultaneously with the operations of the first manipulator and the second manipulator.

* * * * *